J. W. COMPOS.
SCALE HOLDER.
APPLICATION FILED FEB. 19, 1919.
1,302,311.
Patented Apr. 29, 1919.
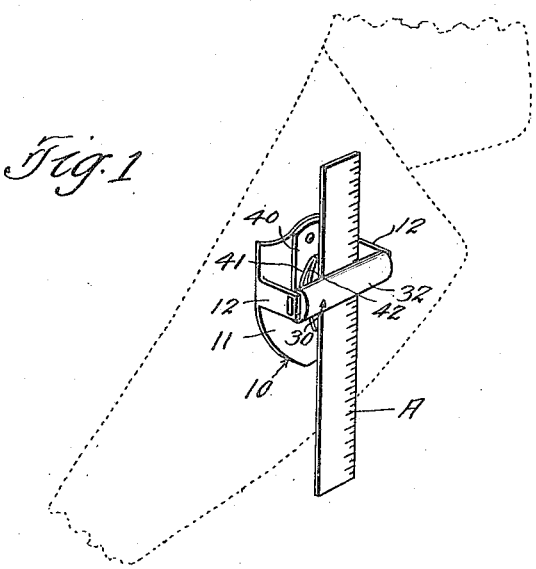
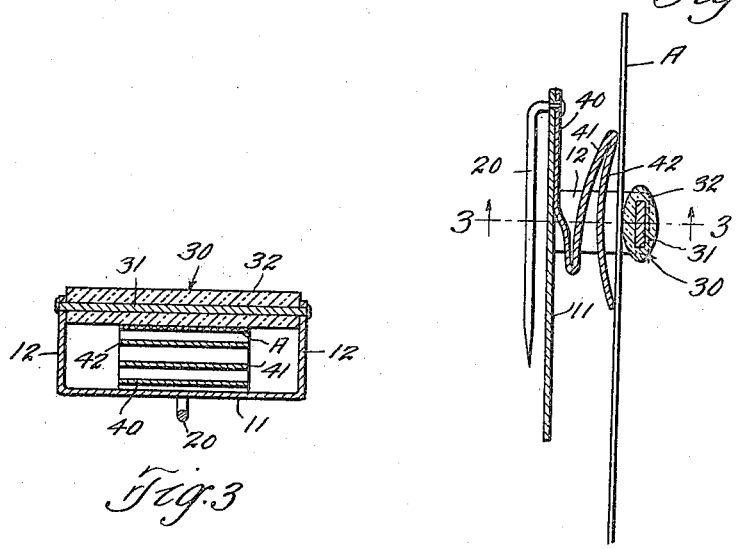
Inventor
James W. Compos,
By Baker & Macklin,
Attorneys.

UNITED STATES PATENT OFFICE.

JAMES W. COMPOS, OF CLEVELAND, OHIO.

SCALE-HOLDER.

1,302,311.  Specification of Letters Patent.  Patented Apr. 29, 1919.

Application filed February 19, 1919. Serial No. 278,012.

*To all whom it may concern:*

Be it known that I, JAMES W. COMPOS, a citizen of the United States, residing at Cleveland, in the county of Cuyahoga and State of Ohio, have invented a certain new and useful Improvement in Scale-Holders, of which the following is a full, clear, and exact description, reference being had to the accompanying drawings.

This invention relates to a very simple clamp suitable for attachment to one's garment and adapted to hold a small tool in convenient position. More specifically the clamp is designed for the use of a machinist for carrying the steel scale which he constantly uses. My clamp may readily be attached to the coat of the user. It is arranged so that the scale may be inserted either from below or from above, as may be more convenient, and will be effectively retained in place, though ready for instant removal whenever desired.

The invention is illustrated in the drawings hereof and is hereinafter more fully explained and its essential characteristics are summarized in the claims.

In the drawings, Figure 1 is a perspective view of my clamp holding a scale, a portion of the lapel of the wearer's coat to which it is supposed to be pinned being indicated in broken lines. Fig. 2 is a vertical section of the clamp with a scale in place. Fig. 3 is a cross section as indicated by the line 3—3 on Fig. 2; Figs. 2 and 3 being on an enlarged scale.

The body of the clamp is designated 10. It consists of a piece of sheet metal having a back portion 11 adapted to lie against the wearer's coat and two outwardly turned integral ears 12 at the opposite edges thereof. A suitable pin, as 20, is secured to this body for holding it on the coat.

Between the ears of the body is a cross bar designated 30. This bar is shown as comprising a metal core 31 which has reduced ends extending through the ears 12 and upset to rigidly secure it to them. Surrounding the core is a rubber covering 32.

Secured to the front face of the body is a peculiarly formed leaf spring 40. This spring is shown as riveted at its upper end to the body and extends thence downwardly, then is doubled on itself and extends upwardly at 41 and then is again doubled, extending downwardly at 42. The portion 42 of the spring lies directly behind the cross bar. This portion is curved as shown in Fig. 2, so that its upper and lower ends tend to lie slightly in front of the vertical plane tangent to the rear face of the bar.

An ordinary steel scale is indicated at A in each figure. When this scale lies between the cross bar and leaf spring the front leaf of the spring engages it at two points on the rear side of the scale, while the cross bar engages the scale at an intermediate point on the front side. The spring pressure is sufficient to firmly hold the scale in position, the spring being pressed rearwardly slightly when the scale is put into place.

To enable the scale to be conveniently inserted from above or below, the cross bar is rounded in cross section, as shown in Fig. 2, and the front leaf of the spring is correspondingly concaved. The result is that the operator may insert the scale without having to accurately position it, by simply moving it diagonally downward or upward and toward himself, so that the end of the scale enters the converging space between the front leaf of the spring and the cross bar. The scale in this movement need only be approximately parallel with the face of the clamp and accordingly may be positioned very quickly. With a little practice it will not be necessary for the user to even look at the clamp, as the position on his coat becomes well known to him and he can insert the scale without having to observe it or the clamp. When he desires to use the scale he may grasp either the upper or lower end of it, as most convenient, and pull it up or down out of the clamp.

As heretofore stated, some suitable pin is secured to the body of the device to hold it to the wearer's coat. I prefer to use for this purpose a simple stick pin 20 riveted to the upper end of the body and extending thence slightly rearwardly and thence downwardly. For simplicity and cheapness I may make the riveted end of this stick pin constitute also the rivet which holds the leaf spring to the body, and this is the form shown in the drawing.

Having thus described my invention, what I claim is:

1. In a device of the character described, a body, a pin adapted to secure it to a garment, a cross bar carried by said body, and a leaf spring secured to the body and having the portion adjacent to its free end standing behind the cross bar and extending above and below it.

2. In a device of the character described, a body, a cross member carried thereby, and a spring having its front portion standing behind the cross member and extending some distance above and below it.

3. In a device of the character described, a body, a cross bar carried thereby, and a leaf spring secured to the body and having a portion behind the cross bar concave on its face toward the cross bar.

4. In a device of the character described, the combination of a body having ears, a cross bar carried by said ears, a leaf spring secured to the body and adapted to coact with the cross bar to hold an article between them.

5. In a device of the character described, a body, a yielding cross bar carried thereby, and a leaf spring secured to the body and having a movable portion standing behind the cross bar.

6. In a device of the character described, the combination of a body having ears, a cross bar carried by said ears, a leaf spring secured to the body and adapted to coact with the cross bar to hold an article between them, said cross bars being composed of a core with a yielding cover.

7. In a device of the character described, the combination of a body having a plate-like portion with forwardly extending ears at its edges, a spring secured to the front face of the body, and a cross bar carried by the ears in front of the spring.

8. In a device of the character described, the combination of a body having forwardly extending ears at its edges, a pin secured to the rear face of the body, a spring secured to the front face of the body, and a cross bar carried by the ears in front of the spring.

9. In a clamp of the character described, the combination of a body, means for securing it to a user's garment, a leaf spring doubled on itself and secured at its rear leaf to the body and free at its front leaf, and a cross member secured by the body in front of said front leaf.

10. In a clamp of the character described, the combination of a body, means for securing it to a user's garment, a leaf spring doubled on itself and secured at its rear leaf to the body and free at its front leaf, said front leaf being concaved forwardly, and a yielding cross member secured by the body in front of said front leaf.

11. In a clamp of the character described, the combination of a body having a back plate with forwardly projecting ears, a cross bar carried by the ears, a leaf spring doubled twice upon itself to make three up and down portions, means securing the extreme end of the rearmost portion to the face of the body, the front portion standing freely behind the cross bar, and means carried by said body for securing it to the user's garment.

12. In a clamp of the character described, the combination of a body having a back plate with forwardly projecting edge ears, a cross bar carried by the ears, a leaf spring doubled twice upon itself to make three up and down portions, means securing the extreme end of the rearmost portion to the face of the body, the front portion standing freely behind the cross bar and being concaved forwardly, and a pin carried by said body for securing it to the user's garment.

In testimony whereof, I hereunto affix my signature.

JAMES W. COMPOS.

Copies of this patent may be obtained for five cents each, by addressing the "Commissioner of Patents, Washington, D. C."